Figure 6:
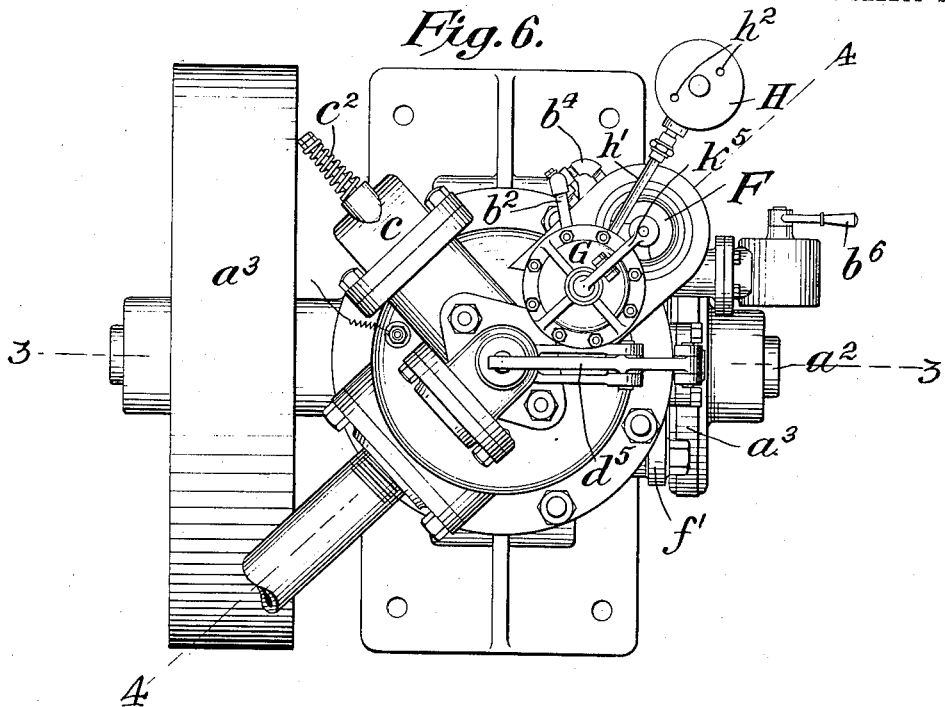

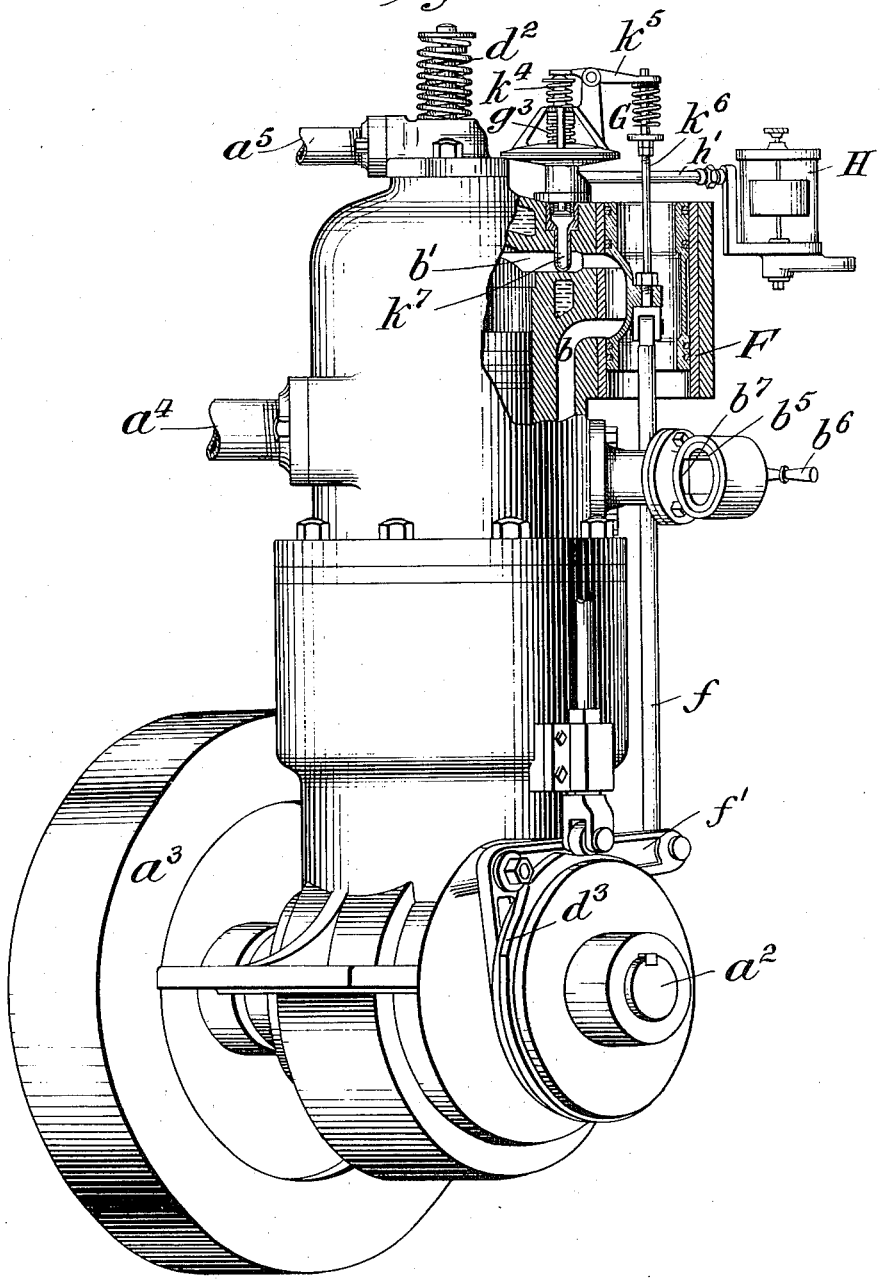

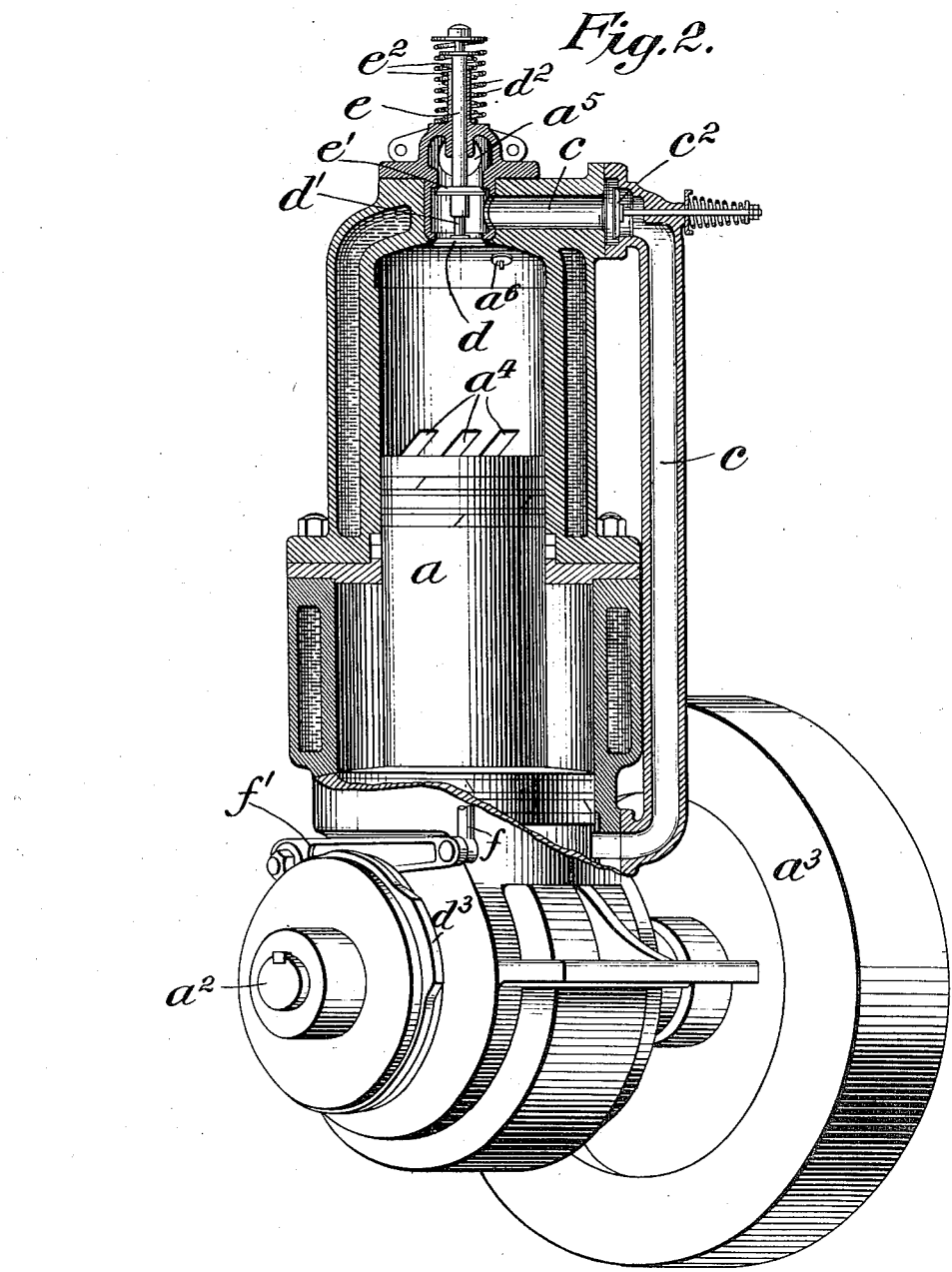

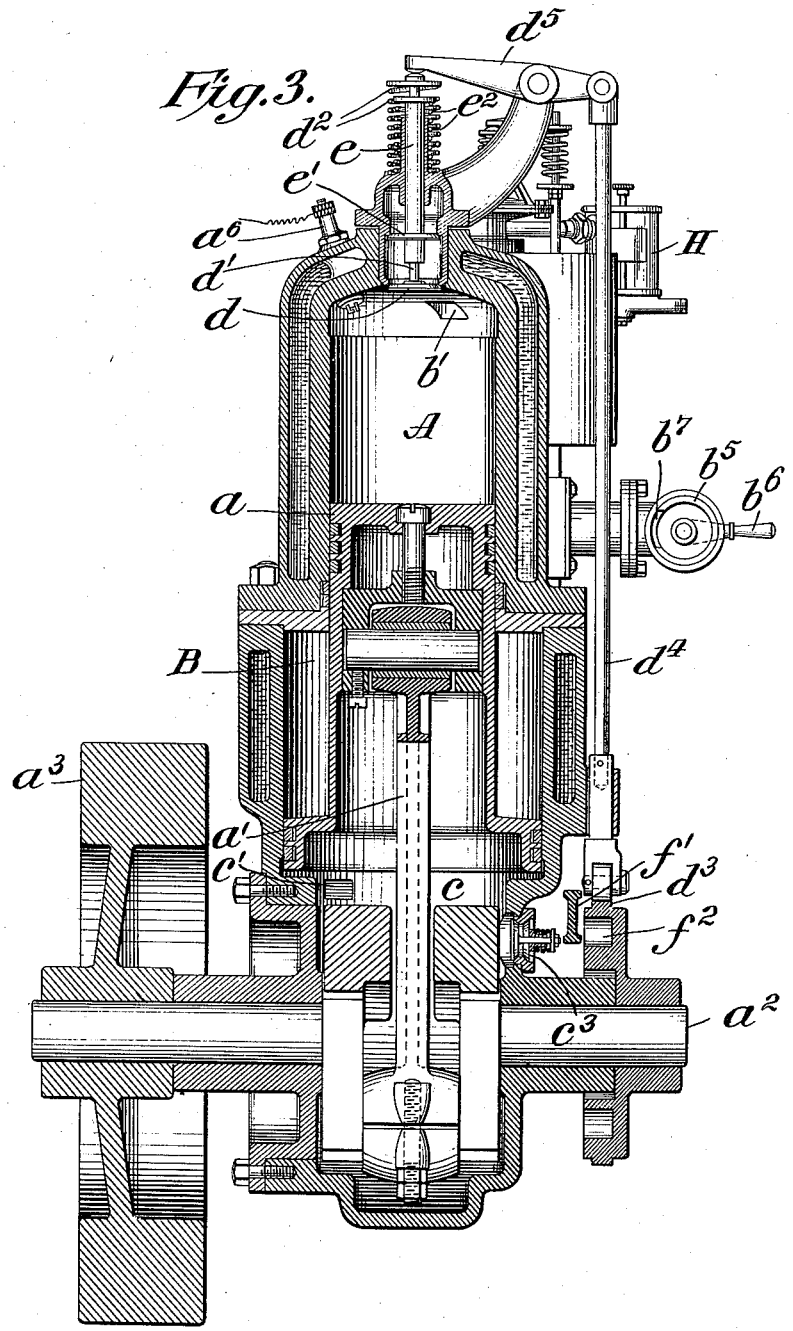

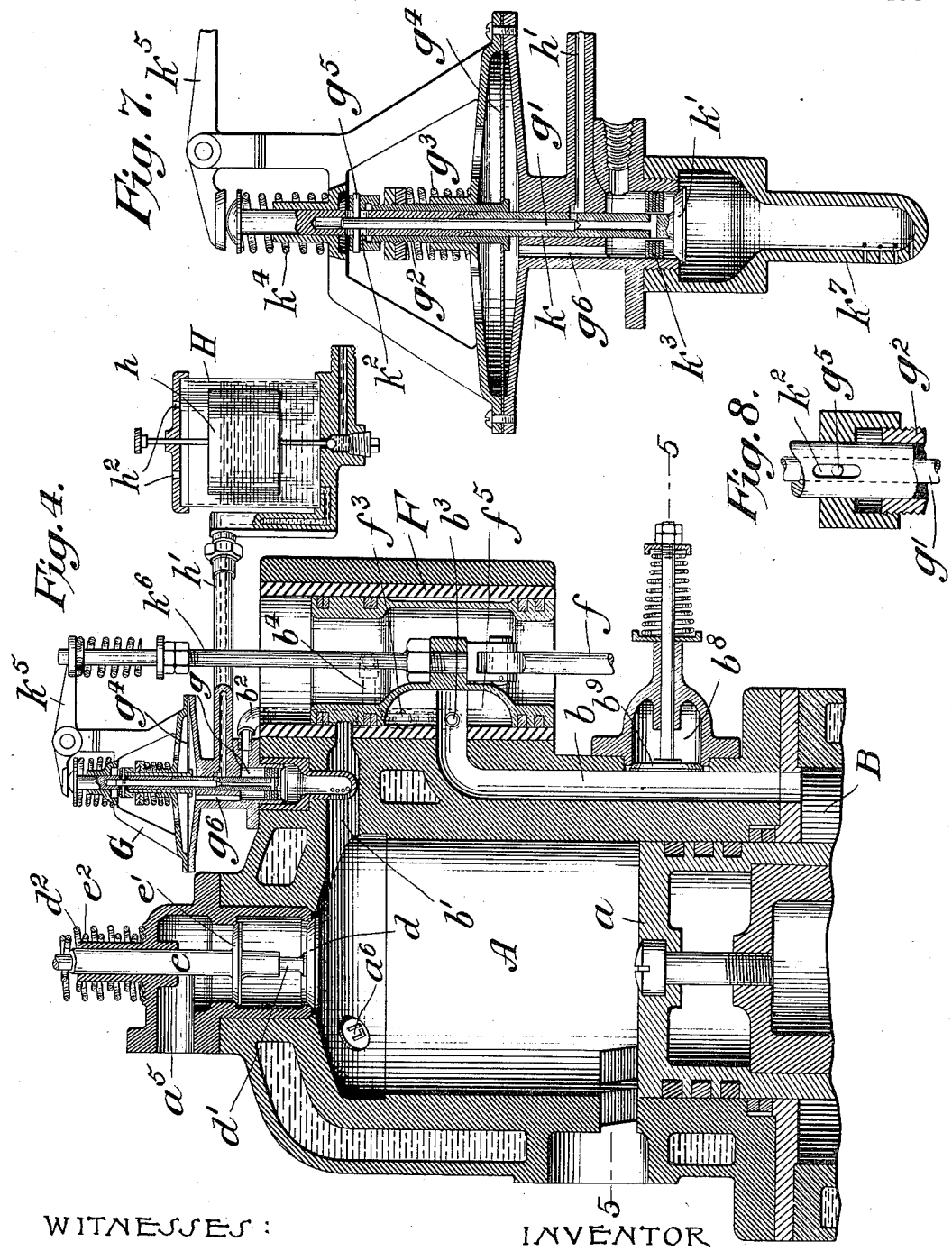

L. E. WRIGHT.
INTERNAL COMBUSTION ENGINE.
APPLICATION FILED OCT. 10, 1907.

977,847.

Patented Dec. 6, 1910.

6 SHEETS—SHEET 5.

WITNESSES:

INVENTOR

BY

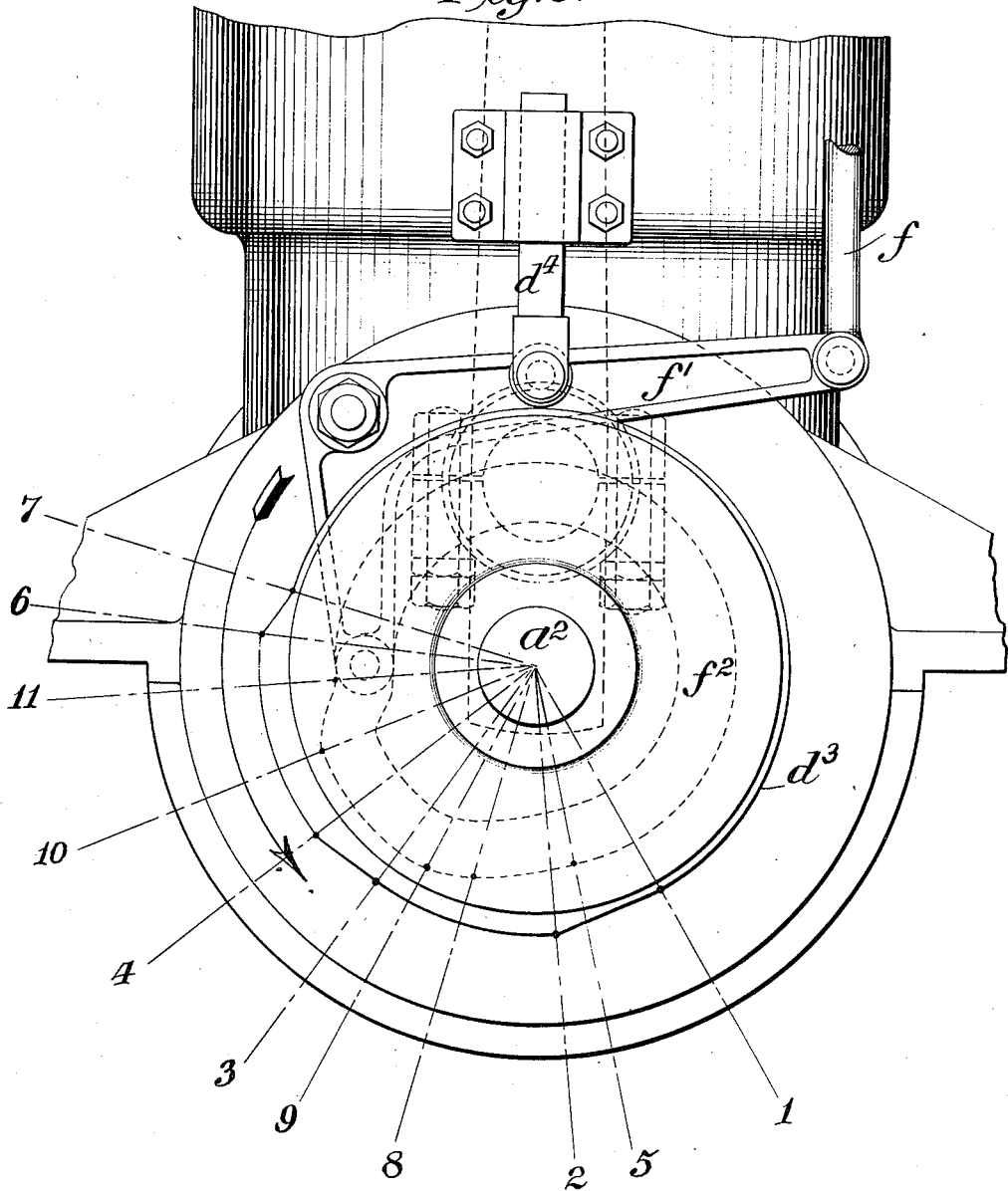

UNITED STATES PATENT OFFICE.

LYSANDER E. WRIGHT, OF NEWARK, NEW JERSEY.

INTERNAL-COMBUSTION ENGINE.

977,847.   Specification of Letters Patent.   Patented Dec. 6, 1910.

Application filed October 10, 1907. Serial No. 396,697.

*To all whom it may concern:*

Be it known that I, LYSANDER E. WRIGHT, a citizen of the United States, and a resident of Newark, in the county of Essex and State of New Jersey, have invented certain new and useful Improvements in Internal-Combustion Engines, of which the following is a specification, reference being had to the accompanying drawings, forming a part hereof.

This invention relates to improvements in internal combustion engines of the explosion type in which an explosion occurs every time the piston starts upon its forward stroke as distinguished, for instance, from engines of the four cycle or some other variety where the arrangements for the scavenging of the exhaust gases and the introduction and compression of a new charge require explosions of lesser frequency.

The general object of the present improvements is to provide means for thoroughly scavenging the cylinder after each explosion, for the introduction and throttling of the fuel and for the compression of the charge; and also to devise, for an engine of the class referred to, an operating cycle in which the scavenging and the introduction and compression of the charge shall be so related to each other as to promote considerably the efficiency of the engine. To attain these objects, a mechanism has been evolved to operate in accordance with the following cycle: When the piston has nearly completed its forward stroke, exhaust ports are uncovered thereby, allowing the cylinder to relieve itself of exhaust gases, and at about the same time a valve in the head of the cylinder is opened to permit air, (which has been compressed in the crank chamber by the forward stroke of the piston) to rush into the cylinder and assist in driving out the dead gases through the exhaust openings. As soon as these exhaust openings are closed by the piston on its return stroke, another valve is opened in the head of the cylinder to permit the piston, on its return stroke, to drive out what may be referred to as the scavenging air, and this the piston continues to do until it has reached a point where the rest of its return movement is required for the compression of the next charge. The latter is introduced at this point by being blown into the cylinder through the means of an air blast which is furnished from an auxiliary cylinder, air being drawn into this cylinder by the forward movement of the piston and compressed by the return movement thereof. The charge, being thus introduced as the piston is rapidly approaching the limit of its return movement, is compressed by the piston which operates in conjunction with the piston in the auxiliary cylinder, communication having been established between the power cylinder and the auxiliary cylinder immediately following the introduction of the charge.

In carrying out the improvements, the piston in the auxiliary cylinder is preferably secured to or made integral with the power piston and serves to compress the air in the auxiliary cylinder and crank case. In accordance with the invention an improved valve and operative connections therewith are provided to control communication between the auxiliary cylinder and power cylinder and also to control communication between the auxiliary cylinder and the carbureter and fuel supplying means. Moreover, an improved oil regulating device and carbureter have been devised as well as novel connections between these parts and the auxiliary cylinder whereby a new method of mixing, introducing and controlling the fuel elements is provided. In accordance with these improvements, the quantity of oil or other fuel introduced into the power cylinder to form the basis of each charge is automatically proportioned to the quantity of air admitted so that at all times the quality of the mixture is uniform; and in connection with this automatic proportioning of the fuel elements with respect to each other, means are provided, preferably under control of engine governing mechanism, for limiting the amount of air which is admitted to the auxiliary cylinder thereby controlling the pressure in said cylinder and thus determining or regulating each charge both quantitatively and as to the degree of its compression. The improved engine may thus be absolutely controlled through a single means, as will be more fully explained hereinafter.

Besides the various features of invention hereinbefore enumerated, the improvements comprise various details of construction all of which will be explained in connection with the following description and upon reference to the drawings.

Figure 5:
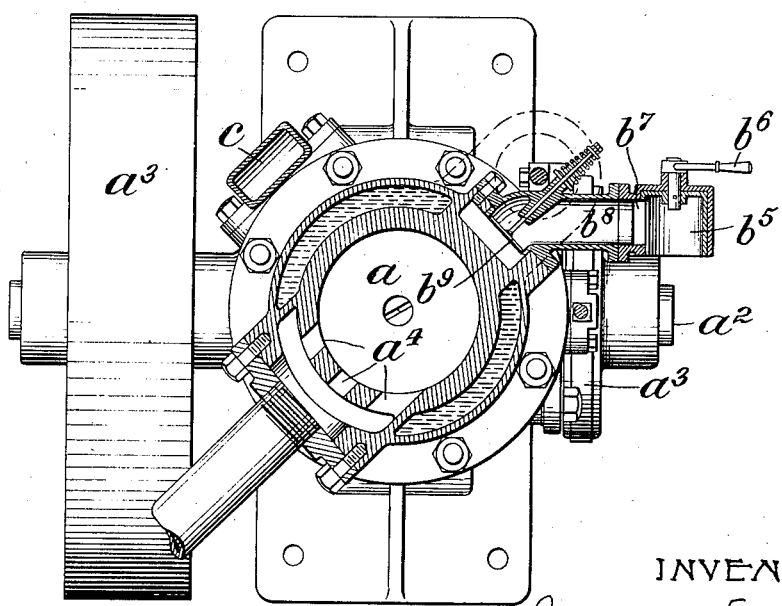

In said drawings, Figure 1 is a broken view partly in section and partly in elevation, of an engine embodying the improvements. Fig. 2 is a similar view, the plane of section being substantially at right angles to the plane of the section shown in Fig. 1. Fig. 3 is a view wholly in vertical section, the plane of the section being indicated by the line 3—3 in Fig. 6. Fig. 4 is an enlarged view of the portion of the engine shown in section in Fig. 1, the plane of this section being indicated in Fig. 6 by line 4—4. Fig. 5 is a sectional view taken on a plane indicated by the line 5—5 in Fig. 4. Fig. 6 is a top plan view, Fig. 7 is a detail sectional view of the oil controlling device, and, Fig. 8 is a detail sectional view of the top of a valve in the oil regulating device, and, Fig. 9 is a view in elevation, on an enlarged scale, showing clearly a couple of cam surfaces which are employed for operating certain valves.

The improvements are illustrated as embodied in an engine having a vertical or upright working cylinder A provided with a trunk piston $a$ connected by means of the pitman $a'$, with the crank shaft $a^2$ which latter may be provided with a fly wheel $a^3$. One end of the piston has a working fit in the cylinder A and the other end of the piston has a working fit in an auxiliary cylinder B, formed directly below the cylinder A and adjacent to the crank chamber C underneath. The casing of the cylinder B as well as the casing of the cylinder A may be water jacketed as shown in order to cool these cylinders in the usual manner. The crank chamber C, which is air tight, and in which air is compressed upon the forward movement of the piston, communicates with the head of the working cylinder A through the medium of a suitable conduit $c$ (Figs. 2, 5 and 6) leading off from the chamber C at $c'$ (Fig. 3) and suitably secured to the casing of the engine. At the cylinder end of this conduit is a valve $d$ provided upon a long stem $d'$ and normally held upon its seat by a spring $d^2$. This valve is opened at regular intervals by a cam $d^3$ which operates upon the same through suitable connections such as a rod $d^4$ and lever $d^5$, and thus admits air under pressure from the crank chamber C into the cylinder A, which air drives out the exhaust gases, as will be explained more fully hereinafter, through exhaust ports $a^4$. Upon a sleeve $e$ which surrounds and is longitudinally movable upon the stem $d'$ is another valve $e'$ in the head of the cylinder which valve $e'$ is normally retained upon its seat by a spring $e^2$. This valve $e'$ is also opened at regular intervals by the cam $d^3$ through the medium of the rod $d^4$ and lever $d^5$, it being readily understood from Fig. 3 that when the lever $d^5$ is moved sufficiently it will not only depress the stem $d'$ but will cause both the stem $d'$ and the sleeve $e$ to move, thus opening both valves $d$ and $e'$. When both of these valves are open, the piston is on its return stroke and will drive out some of the air and gases in the cylinder A which will issue from an exhaust port $a^5$ in the head of the cylinder A, a check valve $c^2$ being provided in the conduit C in order to prevent any gases from entering this conduit from the cylinder.

The auxiliary cylinder B communicates with the head of the working cylinder A by means of a suitable duct or conduit $b$ and a suitable duct or conduit $b'$, both ducts being preferably formed in the cylinder casing, and these ducts communicate with each other through the medium of a sliding or piston valve F suitably supported upon the side of the engine and operated by a rod $f$ secured to a bell crank lever $f'$ which is rocked by a cam $f^2$. This cam may be formed as a groove $f^2$ in the cam member $d^3$ which is preferably secured upon the end of the crank shaft $a^2$ opposite the fly wheel $a^3$, a roller being provided upon the bell crank $f'$ which rides in the groove $f^2$. The valve F, besides serving to connect the conduits $b$ and $b'$ and thus establishing communication between the auxiliary cylinder B and working cylinder A, also serves to establish communication between the cylinder B and a chamber $g$ in the carbureter and oil controlling device G.

As clearly shown in Fig. 4, the duct or conduit $b$ terminates in the wall of the cylinder or chamber in which the valve F moves, the mouth of the duct being always in communication with a chamber or recess $f^5$ which is formed in the body of the valve F and extends around the same. A pipe $b^2$, which is shown partly in full lines and partly in dotted lines in Fig. 4, and is also shown in plan view in Fig. 6, extends from an opening $b^3$ in the wall of the duct $b$ to the chamber $g$. A branch pipe $b^4$, shown in dotted lines in Fig. 4 and in plan view in Fig. 6, also establishes communication between an orifice in the wall of the cylinder or chamber in which the valve F moves and the pipe $b^2$, but at a higher point than the orifice $b^3$. A check valve, shown by dotted lines at $f^3$ in Fig. 4, is interposed in the pipe $b^2$ between the mouth $b^3$ and the point where the branch pipe $b^4$ connects with the pipe $b^2$, opening toward the auxiliary cylinder B. It will now be seen that when the valve F is in the position shown in Fig. 4, which it occupies when the piston in the power cylinder is moving forward and the air in the auxiliary cylinder is in a state of rarefaction, communication is established between the oil feed chamber $g$ and the auxiliary cylinder B, so that a charge of oil is drawn in, the amount of oil so drawn in being proportionate to the degree of rarefaction of the air in the auxiliary cylinder B and therefore, since the degree of rarefaction is controlled by the throttle, in proportion to the load on the engine. When the valve F is in the position already described, the mouth of the branch pipe $b^4$ is closed by the valve, but when the valve is raised to uncover the mouth of the branch pipe $b^4$, which position is assumed after the piston in the power cylinder has commenced its rearward stroke and the air in the auxiliary cylinder is in a state of compression, compressed air from the auxiliary cylinder will be delivered through the duct $b$, the valve space or recess $f^5$, the branch pipe $b^4$, and the pipe $b^2$, so as to atomize the oil and drive it into the power cylinder. The check valve $f^3$ prevents the delivery of the compressed air through the mouth $b^3$ of the pipe $b^2$, the proper time for the delivery of the compressed air being determined by the uncovering of the mouth of the branch pipe $b^4$ by the movement of the valve F, while the check valve permits direct communication to be established between the chamber $g$ and the auxiliary cylinder B when the pressure in the cylinder is less than that in the chamber, the latter being in communication with the atmosphere through the body of the fuel and therefore under atmospheric pressure.

Referring now to the oil regulating and controlling device G, which has already been alluded to, it will be seen, particularly from Figs. 4 and 7, that this device includes a valve, preferably a needle valve $g'$ mounted within a sleeve $g^2$ which is normally urged upward to move the valve away from its seat by a spring $g^3$ but which is controlled by a diaphragm $g^4$ secured to the sleeve $g^2$. The diaphragm chamber communicates with the chamber $g$ through a suitable duct $g^6$ and is preferably open to the atmosphere above the diaphragm. The oil, or other fuel is supplied from a reservoir H provided with the usual float valve $h$ to maintain the oil at a predetermined level therein and with air holes $h^2$ to be referred to presently; this reservoir communicates through a pipe $h'$ with the oil regulating device G, the needle valve $g'$, as will be obvious, controlling the admission of the oil into the oil regulating apparatus from the pipe $h'$. It will be clear that the rarefaction of air in the auxiliary cylinder B will reduce the pressure upon the under side of the diaphragm below that of the atmosphere and hence the pressure upon the upper side of the diaphragm will operate against the spring $g^3$ and will cause the needle valve to restrict the oil opening more or less according to the degree of rarefaction in the cylinder B. The air holes in the oil reservoir prevent any back pressure or suction from interfering with the flow of the oil from the reservoir, and on account of the communication of the upper side of the diaphragm with the atmosphere, the pressure upon the oil, at all times except when a rarefaction occurs in the auxiliary cylinder, may be said to be balanced, that is there will be no tendency for any oil to flow past the needle valve except when a rarefaction occurs in the cylinder B. The oil entering from the pipe $h'$ and passing the needle valve $g'$ is delivered through a hollow valve stem $k$ upon which a valve $k'$ is secured, the latter controlling the passage of fuel mixture into the working cylinder. This valve stem $k$ is longitudinally movable within the sleeve $g^2$ and is slit at $k^2$ so as to permit the valve $g'$, which is supported by a cross pin $g^5$ in a cap upon the sleeve $g^2$, to move freely and independently thereof. The oil which runs down through the valve stem $k$ is deposited by suitable ducts in said stem upon a gauze-like or other suitable substance $k^3$ which forms a sort of carbureter and surrounds the valve stem near the lower end thereof. The upper end of the valve stem $k$ is provided with a spring $k^4$ which normally holds the valve $k'$ upon its seat and a lever $k^5$ which is operated from the piston valve F through a rod $k^6$, serves to open the valve $k'$ at regular intervals. When the valve $k'$ is open, it will be noticed that the stem of this valve, moving as it does across the oil pipe $h'$, absolutely cuts off communication with the oil pipe. The fuel mixture is discharged into the cylinder through the duct $b'$, a nozzle $k^7$ being preferably provided to conduct the fuel mixture from the valve $k'$ into this duct and to discharge it in the direction of the working cylinder.

The operation of the engine will now be described.

A convenient starting point in the operating cycle is with the explosion of the charge. The charge may be ignited by any suitable means which are indicated sufficiently at $a^6$ in the head of the working cylinder A. Upon the explosion the piston, as will be understood, moves forward, that is downward in the drawings, from the expansion of the gases under combustion. When the piston has traveled nearly all of its forward or power stroke, it begins to uncover the exhaust ports $a^4$, and when the ports are well uncovered toward the end of the power stroke, the cam $d^3$, through the connections above described, causes the valve $d$ to open thus permitting the air which has been drawn into the crank chamber C through a check valve $c^3$ and compressed therein during this same forward or power stroke of the piston, to be forcibly discharged into the head of the power cylinder A and thus to drive out through the exhaust port $a^4$ such gases of combustion as remain in the cylinder A. The capacity of the crank casing is considerably larger, (about twice as large in the present case) as the capacity of the power cylinder and hence the amount of air furnished for scavenging will be considerably more than enough to fill the power cylinder at atmospheric pressure. Considerable of the scavenging air, as will be clear, will be discharged together with the gases of combustion through the exhaust ports $a^4$. On the return stroke of the piston, when it has reached the point where it covers the exhaust ports $a^4$, the cam $d^3$ moves the lever $d^5$ sufficiently to open the valve $e'$ so that both the valves $d$ and $e'$ are now open and permitting the piston on its further return stroke to discharge the scavenging gases, that is the remainder of the air introduced into the cylinder from the crank chamber C together with what mixture of gases of combustion this air may contain. This scavenging air continues to be discharged from the exhaust port $a^5$ in the head of the cylinder until just before the new charge is introduced, which point occurs, in the present engine, when the piston has completed all but about four-elevenths of its return or upward stroke. Returning now again to the forward stroke of the engine, it will be seen that while air is compressed by the forward end of the piston in the crank chamber C, it will be rarefied in the chamber B unless means are provided to permit air to be drawn into the cylinder B without restriction. The means provided to admit air into cylinder B consist of a port $b^8$ opening into the duct $b$ and provided with a check valve $b^9$. This port, moreover, is controlled by means of an intake regulator which may be of any suitable form. As illustrated particularly in Figs. 3 and 5 this intake regulator will be seen to comprise a cylindrically shaped valve $b^5$ which can be turned through the instrumentality of a lever $b^6$, which will generally be governor-controlled in practice, so as to regulate the size of the intake opening $b^7$ whereby the amount of air admitted into the chamber B through the port $b^8$ and the duct $b$ during the forward stroke of the piston may be governed, that is restricted to any extent or cut off entirely. During the entire forward or downward stroke of the piston the valve F is in its lowermost position, that is the position illustrated in Fig. 4, for instance; in this position of the valve as well as in all positions of this valve, any temporary rarefaction of air in the cylinder B will be communicated through duct $b$ and pipe $b^2$ to chamber $g$ and through duct $g^6$ to the diaphragm chamber underneath the diaphragm of the oil regulating device G. This, as has already been explained, will permit the atmospheric pressure upon the top of the diaphragm to depress the same and move the needle valve $g'$ downwardly in accordance with the intensity or degree of the rarefaction so that the greater the rarefaction of air in the cylinder B the smaller will be the opening between the valve $g'$ and its seat and accordingly the smaller will be the quantity of oil delivered through the stem $k$ upon the gauze-like substance $k^3$.

As has already been noted, the spring $g^3$ acts in opposition to the pressure upon the diaphragm and inasmuch as the contraction of the spring is proportionate to the compressing or contracting force and the pressure tending to depress the diaphragm is proportionate to the degree of rarefaction in the cylinder B, this spring may be adjusted initially so that there will be at all times a proper ratio between the pressure on the one hand tending to move the needle valve to restrict the oil orifice and the spring acting on the other hand to move the needle valve away from the oil orifice. In this way the oil is always throttled in accordance with the degree of the rarefaction with the result that the mixture is always uniform. Moreover, as the degree of rarefaction is controlled through the intake regulator for the cylinder B, the quantity of oil delivered for each charge may be varied from zero to the full charge, varying between these limits, as will be obvious, according to the amount of air admitted into the cylinder B. In this way therefore the engine is absolutely controlled through the intake regulator, which may be governed automatically according to the needs of the moment. It will now be assumed that a charge of oil has been delivered upon the gauze-like substance $k^3$ from the oil chamber and that the piston has proceeded upon its return stroke and has reached substantially the four-elevenths point or thereabout referred to above. At this point the cam $d^3$ permits the springs $d^2$ and $e^2$ in the head of the cylinder to close the valves $d$ and $e'$ therein. Immediately thereafter the cam $f^2$, through the connections above referred to, causes the piston valve F to move upward sufficiently to establish communication between the duct $b$ and the chamber $g$ through the pipes $b^4$ and $b^2$, and this same upward movement, through the rod $k^6$ and lever $k^5$ causes the valve $k'$ to be depressed from its seat thus opening communication between the chamber $g$ and the nozzle $k^7$, or what is the same thing between the chamber $g$ and the working cylinder A. The return or upward stroke of the piston however has developed a pressure in the cylinder B over the pressure existing in the cylinder A, as the pressure in the cylinder A at this point is substantially atmospheric, the valves $d$ and $e'$ having just closed; accordingly, this pressure or compression in the cylinder B will be transmitted to the chamber $g$ and will drive the air compressed therein through the gauze-like substance $k^3$ thus effecting a mixture of air and oil and discharging the mixture through the nozzle $k^7$ into the cylinder A in the manner of a blast. While the fuel mixture is thus being injected into the power cylinder, the valve F moves still farther up until it has reached its highest position at which point the ducts $b$ and $b'$ communicate through the valve chamber $f^5$ and the auxiliary cylinder and power cylinder are connected. As the piston completes its return stroke, therefore the final compression is effected by both cylinders. When the piston has finished its rearward or return stroke, the full compression has been effected, the cycle is complete, and the next explosion takes place. Just before this explosion takes place, the valve F returns to its first position, that is its lowermost position, cutting off communication between the ducts $b$ and $b'$ and drawing down at the same time the rod $k^6$ which permits the valve $k'$ to spring back upon its seat.

It has been stated hereinbefore that the explosion charge is introduced when the piston has completed all but substantially four-elevenths of its backward stroke and that the discharge of the scavenging air is cut off at this point. It is desirable to explain briefly just how this point is determined and also to explain the relation between the capacity of the power cylinder and the capacity of the auxiliary cylinder which, on account of the discharge of the scavenging gases has to aid the power cylinder in effecting the compression of the charge. In determining the point for cutting off the discharge of the scavenging air and for introducing the explosive charge, the mean effective compression pressures produced by the power and auxiliary cylinders upon the piston have been calculated for different stages of the stroke, upon the assumption that air is admitted from the auxiliary cylinder to the power cylinder at each stage or point for which a calculation is made. In this way the particular point, where the greatest efficiency is attained, can be easily found. It will be obvious, at a glance, that if air is admitted to the power cylinder too late in the stroke, the auxiliary cylinder will have to compress the air therein considerably more than necessary with the result of a loss in power while, on the other hand, if communication between the auxiliary cylinder and power cylinder is made too early in the stroke, a certain amount of scavenging would be lost, which is a factor of high efficiency, and the piston would begin to work against compression in both cylinders earlier in the stroke. The particular point then which is most efficient for the introduction of the explosive charge is found to be when the piston has completed substantially all but four-elevenths of its return stroke. As it is desirable to effect a certain degree of compression in the power cylinder before the charge is ignited and, as only a limited portion of the stroke is used to effect the compression in the power cylinder, it remains to calculate how much of the compression should be effected by the auxiliary cylinder or, what amounts to the same thing, what the relative dimensions of the auxiliary cylinder must be. As the power cylinder and piston are proportioned in the drawings, the piston would be able to effect alone the proper compression of the charge provided its entire return stroke were utilized for this purpose. It will be assumed therefore that the compression desired is substantially what is represented by the volume of the power cylinder compressed into the clearance in that cylinder. It will be seen then that by making the area of the connections between the power cylinder and auxiliary cylinder equal to the clearance, the area of the auxiliary cylinder should be equal to twice the volume of the power cylinder minus the area traversed by the piston in the power cylinder during that portion of the stroke of the piston which is utilized in effecting the compression. This will be clear if it be considered that at the four-elevenths point of the piston stroke when the discharge of the scavenging air is cut off, the pressure in the power cylinder is substantially atmospheric, and the piston now has only to move through that part of its stroke which is utilized for the final compression. In the power cylinder therefore there is air at atmospheric pressure to an amount equal to the clearance plus an amount equal to the volume represented by the space which the piston now has to travel in the power cylinder. In the auxiliary cylinder and its connections with the power cylinder is air under some compression to an amount equal to twice the volume of the power cylinder minus an amount equal to the volume represented by the space which the piston now has to travel in the power cylinder. When therefore the valve F moves to connect the auxiliary cylinder and power cylinder, the amount of air under final compression will be substantially that represented by twice the volume of the power cylinder and when the piston has completed its rearward stroke, this volume will be compressed into a space equal to twice the clearance, that is into the clearance above the piston plus the space represented by the connections between the power cylinder and auxiliary cylinder. Thus the effective compression will be that desired. Of course, if the connections between the power cylinder and auxiliary cylinder are increased in area, then the auxiliary cylinder will have to be increased in area, all as will now be readily understood. It will also be understood that the calculations just made are in the rough and are only intended to approximate actual conditions. Moreover, they are not considered to state the only possible dimensions or relative dimensions, but are believed at the present time to represent the most efficient working dimensions which can be devised for an engine embodying the present improvements.

Fig. 9 may be referred to for a complete understanding of the cycle of the engine. In this figure a number of broken radial lines have been drawn from the center of the crank shaft $a^2$ outwardly beyond the periphery of the cam surfaces therein illustrated, and will be seen to connect the center of the cam shaft with points upon both cams at which certain movements are imparted to the valve actuating rods $d^4$ and $f$. Referring now to these lines, while noting particularly that the roller through which the rod $f$ is actuated is ninety degrees behind the roller through which the rod $d^4$ is actuated, it will be observed that the line 1 indicates the point upon the outer cam which has to reach and actuate the corresponding roller after an explosion has occurred. At this point the valve $d$ begins to open. Line 2 indicates the point at which this valve is opened to its full extent. Line 3 indicates the point where the rod $d^4$ begins to lift sufficiently to open the valve $e'$. Line 4 indicates the point at which the valve $e'$ is wide open. Line 5 indicates the point upon the inside cam at which the piston valve F starts to move upward. Line 6 indicates the point at which the rod $d^4$ moves to permit the valves $d$ and $e'$ to close. Line 7 indicates the point at which the valves $d$ and $e'$ are closed. Line 8 indicates the point at which the piston valve F commences to open communication between the compression cylinder and the power cylinder. Line 9 indicates the point at which full communication between the two cylinders is established. Line 10 indicates the point at which the piston valve starts to move downward to cut off communication between the two cylinders and line 11 indicates the point where the piston valve has fully cut off such communication. As stated before it should be kept in mind that the roller through which the piston rod $f$ is operated is ninety degrees behind the roller through which the valves in the cylinder head are operated, if the cams rotate in the direction of the arrow.

It will be understood that the present structure described and illustrated herein is only one embodiment of the improvements and that many departures may be made from this structure without avoiding the spirit of the invention.

I claim as my invention:

1. An internal combustion engine having a power cylinder provided with an exhaust port near each end, the exhaust port near one end being uncovered by the piston as it is completing its power stroke, and with means for supplying the explosive charge and independent means at the other end to permit the introduction of scavenging air when the piston is at the end of its power stroke, and means at said other end to permit the scavenging air to be displaced by the piston upon its return stroke.

2. An internal combustion engine having a power cylinder provided with an exhaust opening at each end, the exhaust opening at one end being uncovered by the piston when it has nearly completed its power stroke, and with means for supplying the explosive charge, a valve controlling the exhaust opening at the other end, an independent inlet for the introduction of scavenging air at said other end, a valve to control said inlet, mechanically operated means to open and hold open the last named valve to admit the scavenging air when the piston is nearing the completion of its power stroke and during a portion of the return stroke, and means to open the other valve when the piston has covered the exhaust opening on its return stroke to permit the displacement of a portion of the air remaining in the power cylinder.

3. An internal combustion engine having a power cylinder provided with an exhaust opening at each end, the exhaust opening at one end being uncovered by the piston when it has nearly completed its power stroke, a valve controlling the exhaust opening at the other end, a chamber in which air is compressed by the piston, an inlet for the introduction of this air into the other end of the cylinder for scavenging, a valve to control the introduction of the scavenging air, means to open the last named valve to admit the scavenging air when the piston is nearing the completion of its power stroke, and means to open the other valve when the piston has covered the exhaust opening on its return stroke.

4. An internal combustion engine having a power cylinder with a valve chamber in the cylinder head, two valves controlling separate ports leading from said chamber to the cylinder and to the exhaust respectively, means to introduce scavenging air into the valve chamber, an exhaust port controlled by the outer valve, and means to open the inner valve to permit the scavenging air to enter the cylinder and then to open the outer valve while the inner valve is still open to permit the scavenging air to be displaced from the cylinder by the piston.

5. In an internal combustion engine, means to regulate the explosive mixture and control the introduction thereof comprising a diaphragm-actuated valve, a chamber containing oil receiving means and communicating with the diaphragm chamber, an auxiliary cylinder in which air is adapted to be alternately rarefied and compressed communicating with said chamber containing the oil receiving means, a valve controlling the outlet from said last named chamber to the power cylinder, and another valve operating simultaneously with the second named valve to permit the compressed air in the auxiliary cylinder to be communicated to the last named chamber for the purpose of atomizing the oil and blowing the mixture into the power cylinder when the second named valve is opened.

6. In an internal combustion engine, the combination of a valve controlling the admission of the explosive mixture to the power cylinder, said valve having a hollow stem, means to admit oil through said hollow stem, a needle valve within said hollow stem and adapted to control the admission of oil into said stem, a sleeve upon said stem to which the needle valve is secured, and a diaphragm secured to said sleeve.

7. In an internal combustion engine, the combination of a valve to control the admission of the explosive mixture to the power cylinder, a chamber adjacent to said valve containing oil receiving means, a hollow stem for said valve, means to introduce oil through said hollow stem into said chamber upon the oil receiving means, a needle valve in said hollow stem to control the admission of oil thereto, a sleeve upon said stem to which the needle valve is secured, a diaphragm secured to said sleeve, a diaphragm chamber communicating with the first named chamber, an auxiliary cylinder in which air is alternately rarefied and compressed by the piston, a conduit leading from the auxiliary cylinder to the first named chamber, a check valve in said conduit to prevent communication between the first named chamber and auxiliary cylinder during compression, another valve adapted to establish communication between the first named chamber and the auxiliary cylinder around the check valve, and means to operate the first named valve and last named valve simultaneously.

8. In an internal combustion engine, the combination of a power cylinder, an auxiliary cylinder in which air is alternately rarefied and compressed by the piston, means to control the admission of air into said auxiliary cylinder, regulating means under the control of the rarefaction in the auxiliary cylinder for proportioning the amount of oil admitted for each charge, and means to introduce oil into the power cylinder under the control of the compression in said auxiliary cylinder.

9. In an internal combustion engine, an auxiliary cylinder in which air is alternately rarefied and compressed, a diaphragm chamber, a connection between the diaphragm chamber and auxiliary cylinder to permit the rarefaction in the cylinder to be communicated to the diaphragm chamber, an oil regulating valve operatively connected with the diaphragm so that said valve will be forced toward its seat as the rarefaction in the auxiliary cylinder is increased, and means normally tending to hold the valve away from its seat.

10. In an internal combustion engine, an auxiliary cylinder in which air is alternately rarefied and compressed, a diaphragm one side of which is exposed to the atmosphere, a connection between the chamber on the other side of the diaphragm and the auxiliary cylinder, a check valve in said connection to permit communication between the auxiliary cylinder and diaphragm chamber only upon a rarefaction in the auxiliary cylinder, an oil regulating valve operatively connected with the diaphragm so that said valve will be forced toward its seat as the rarefaction in the auxiliary cylinder increases, and an adjustable spring tending to hold the valve away from its seat.

11. In an internal combustion engine, the combination with the power cylinder, of oil receiving means, an auxiliary cylinder in which air is compressed, and a piston valve adapted to establish communication between the auxiliary cylinder and oil receiving means and between the auxiliary cylinder and power cylinder respectively.

12. In an internal combustion engine, the combination with the power cylinder, of an auxiliary cylinder in which air is alternately rarefied and compressed, an oil regulating valve, an oil receiving means, a connection between the oil regulating valve and auxiliary cylinder to permit the rarefaction in the cylinder to be communicated to said valve, and a piston valve to permit the compression in the cylinder to be transmitted first to the oil receiving means and then directly to the power cylinder.

13. In an internal combustion engine, the combination with the power cylinder, of an auxiliary cylinder in which air is alternately rarefied and compressed, an oil regulating valve, an oil receiving means, a connection between the oil regulating valve and auxiliary cylinder to permit the rarefaction in the cylinder to be communicated to said valve, and means to permit the compression in the cylinder to be transmitted first to the oil receiving means and then directly to the power cylinder.

14. In an internal combustion engine, an oil reservoir open to the atmosphere, an oil valve to control the flow of oil from said reservoir, and a diaphragm operatively connected with the valve, one side of which is exposed to the control of the engine and the other side of which is exposed to the atmosphere.

15. In an internal combustion engine having a power cylinder provided with an exhaust port near its forward end and with means for supplying the explosive charge, a chamber of larger capacity than the power cylinder in which air is compressed by the forward movement of the piston, independent means at the head end of the cylinder to permit the introduction of air compressed in said chamber in order to drive the dead gases out of the exhaust port at the forward end when the piston is at the forward limit of its stroke, a cam and operative connections between said means and cam whereby said means are mechanically controlled to operate at a predetermined time.

16. In an internal combustion engine, the combination of a power cylinder, an auxiliary cylinder in which air is alternately rarefied and compressed, a conduit provided with a check valve and communicating with the auxiliary cylinder, a chamber communicating with said conduit, with the power cylinder and with an oil supply under atmospheric pressure, a valve to control the communication between the chamber and the oil supply, means operated by rarefaction in the auxiliary cylinder to control said valve, a valve to control the communication between the chamber and the power cylinder, a valve to control the communication between the chamber and the auxiliary cylinder and means operated by the engine to open and close both of said last named valves at predetermined times.

17. In an internal combustion engine, the combination of a power cylinder, a compressor, an oil supply, means to regulate the admission of air to the compressor during the suction stroke thereof, and means controlled by the degree of rarefaction in the compressor during the suction stroke to regulate the delivery of oil from the oil supply, whereby the admission of oil at each stroke is proportioned to the throttling of the air.

This specification signed and witnessed this 3d day of October A. D., 1907.

LYSANDER E. WRIGHT.

Signed in the presence of—
ELLA J. KRUGER,
AMBROSE L. O'SHEA.